(12) United States Patent
Kim et al.

(10) Patent No.: US 11,371,749 B2
(45) Date of Patent: Jun. 28, 2022

(54) FUME EXHAUST ASSEMBLY AND GAS WATER HEATER

(71) Applicant: WUHU MIDEA KITCHEN AND BATH APPLIANCES MFG. CO., LTD., Wuhu (CN)

(72) Inventors: Kiweon Kim, Wuhu (CN); Sheng Liu, Wuhu (CN); Zuan Lu, Wuhu (CN)

(*) Notice: Subject to any disclaimer, the term of this patent is extended or adjusted under 35 U.S.C. 154(b) by 0 days.

(21) Appl. No.: 17/055,596

(22) PCT Filed: Dec. 10, 2018

(86) PCT No.: PCT/CN2018/119976
§ 371 (c)(1),
(2) Date: Nov. 15, 2020

(87) PCT Pub. No.: WO2019/218651
PCT Pub. Date: Nov. 21, 2019

(65) Prior Publication Data
US 2021/0222912 A1    Jul. 22, 2021

(30) Foreign Application Priority Data
May 14, 2018 (CN) .......................... 201820718589.2

(51) Int. Cl.
*F22B 37/06* (2006.01)
*F24H 9/00* (2022.01)
*F23J 13/04* (2006.01)

(52) U.S. Cl.
CPC ............ *F24H 9/0026* (2013.01); *F23J 13/04* (2013.01); *F23J 2213/302* (2013.01); *F23J 2900/13004* (2013.01)

(58) Field of Classification Search
CPC .................................. F22B 13/02; F22B 37/06
See application file for complete search history.

(56) References Cited

U.S. PATENT DOCUMENTS

| 1,121,957 A | 12/1914 | Pietro |
| 4,481,935 A * | 11/1984 | Bawel ...................... F23J 13/04 |
| | | 126/307 R |

(Continued)

FOREIGN PATENT DOCUMENTS

| CN | 2739529 Y | 11/2005 |
| CN | 201145389 Y | 11/2008 |

(Continued)

OTHER PUBLICATIONS

International Search Report of PCT/CN2018/119976.

(Continued)

*Primary Examiner* — Gregory A Wilson
(74) *Attorney, Agent, or Firm* — Kilpatrick Townsend & Stockton, LLP

(57) ABSTRACT

A fume exhaust assembly for a gas water heater. The fume exhaust assembly comprises a fume exhaust hood; the fume exhaust hood is provided with a fume exhaust pipe; the fume exhaust pipe and the fume exhaust hood are integrally formed. By means of integral formation, an assembly operation for the fume exhaust pipe and the fume exhaust hood is saved, an assembly procedure of a gas water heater product is simplified, and thus the production efficiency of the gas water heater product can be improved.

11 Claims, 11 Drawing Sheets

(56) References Cited

U.S. PATENT DOCUMENTS

| | | | | |
|---|---|---|---|---|
| 5,680,856 | A | * | 10/1997 | van Dijk ................ F23J 13/025 |
| | | | | 126/307 R |
| 7,433,180 | B2 | * | 10/2008 | Ahn ........................ H01J 11/54 |
| | | | | 361/679.27 |
| 8,156,931 | B2 | * | 4/2012 | Jacklich ................ F24C 15/002 |
| | | | | 126/85 B |
| 10,605,454 | B2 | * | 3/2020 | Matsunaga .............. F23J 13/04 |

FOREIGN PATENT DOCUMENTS

| | | | |
|---|---|---|---|
| CN | 103604215 | A | 2/2014 |
| CN | 203670302 | U | 6/2014 |
| CN | 204787262 | U | 11/2015 |
| CN | 205640855 | U | 10/2016 |
| CN | 106322751 | A | 1/2017 |
| CN | 112212503 | * | 1/2021 |
| EP | 0226534 | A1 | 6/1987 |
| EP | 1182408 | A2 | 2/2002 |
| JP | 2000274829 | A | 10/2000 |

OTHER PUBLICATIONS

Written Opinion of the International Searching Authority for PCT/CN2018/119976.
The extended European search report of EP Application No. 18919353.5.

* cited by examiner

FUME EXHAUST ASSEMBLY AND GAS WATER HEATER

CROSS-REFERENCES TO RELATED APPLICATIONS

The present disclosure is a national phase application of International Application No. PCT/CN2018/119976, filed on Dec. 10, 2018, which claims the Priority of Chinese Application No. 201820718589.2, filed in the Chinese Patent Office on May 14, 2018, the entireties of which are herein incorporated by reference.

FIELD

This application relates to the field of water heaters, and more specifically, to a fume exhaust assembly and a gas water heater with the fume exhaust assembly.

BACKGROUND

Gas water heaters generally exhaust fume through connected fume exhaust hood and fume exhaust pipe, while the fume exhaust hood and the exhaust pipe of related gas water heaters are two independent parts. When the water heaters are produced and assembled, workers need to install and fix the fume exhaust hood with the fume exhaust pipe, resulting in complicated assembly procedures and low product production efficiency.

SUMMARY

This application aims to solve at least one of the problems existing in the related art.

Therefore, one object of this application is to provide a fume exhaust assembly that can improve production efficiency of a gas water heater.

Another object of this application is to provide a gas water heater including the above-mentioned fume exhaust assembly.

To achieve the above object, some embodiments of a first aspect of this application provides a fume exhaust assembly, which is applied in a gas water heater. The fume exhaust assembly includes a fume exhaust hood. The fume exhaust hood is provided with a fume exhaust pipe, and the fume exhaust pipe and the fume exhaust hood are integrally formed.

In this solution, the fume exhaust pipe and the fume exhaust hood are integrally formed. This design eliminates the assembly work of the fume exhaust pipe and the fume exhaust hood, simplifies the assembly process of the gas water heaters, and improves the production efficiency of the gas water heaters.

In some embodiments, the fume exhaust pipe and the fume exhaust hood are integrally injection molded.

In this solution, both the fume exhaust pipe and the fume exhaust hood are made of plastic materials, and the fume exhaust pipe and the fume exhaust hood are integrated by injection molding, so that the production process of the fume exhaust assembly is simple and the production cost of the fume exhaust assembly is low.

In some embodiments, the fume exhaust hood defines a cavity, a bottom of the cavity is open, and the fume exhaust pipe is arranged at a top of the fume exhaust hood and is in communication with the cavity.

In some embodiments, the fume exhaust assembly further includes a condensate water collection box, and the fume exhaust hood is installed at a top of the condensate water collection box.

The fume exhaust assembly provided by this solution further includes a condensate water collection box. The fume exhaust hood and a heat exchanger of the gas water heater are installed on a top of the condensate water collection box. The fume formed after the combustion of the air and gas mixture enters the heat exchanger first, and the temperature of the fume decreases and a certain amount of condensate is produced after the heat exchange between the fume and the heat exchanger. Then the fume and the condensate water enter the condensate water collection box through the air outlet of the heat exchanger, and then the condensate water is drained from a water outlet at a bottom of the condensate water collection box, while the fume will enter the fume exhaust hood from the condensate water collection box, then enter the fume exhaust pipe from the fume exhaust hood, and then discharged through the fume exhaust pipe.

In some embodiments, the condensate water collection box includes a bottom wall and a side wall extending upward from an edge of the bottom wall, the top of the condensate water collection box defines an opening, and a bottom of the fume exhaust hood is connected to a top of the side wall.

In this solution, the condensate water collection box is a box with an open top, so that the condensate water collection box has a simple structure and low production and processing difficulty.

In some embodiments, the bottom of the fume exhaust hood is connected to the top of the side wall by screws.

In this solution, the fume exhaust hood is installed on the condensate water collection box by screws, so that the fume exhaust hood and the condensate water collection box has high reliability in connection and fixation, and the fume exhaust hood and the condensate water collection box are not prone to loosening. Specifically, one of the bottom of the fume exhaust hood and the top of the side wall is provided with a stud, and the other is provided with a connection hole. When the fume exhaust hood is installed on the condensate water collection box, the stud is aligned with the connection hole and fixed by screws.

In some embodiments, the bottom wall is provided with a support portion including a stud and a support protrusion, the fume exhaust hood is provided with a rib at a side of the bottom close to the support portion, the rib defines a through hole, the rib is abutted against a top of the support protrusion, the through hole is opposite to the stud, a heat exchanger of the gas water heater is connected to the stud by a screw, so that the rib is pressed and fixed on the support protrusion.

In related art, the fume exhaust hood and the heat exchanger are installed on the top of the condensate water collection box, so that the fume exhaust hood, the heat exchanger and the condensate water collection box are communicated. The positions of the fume exhaust hood and the heat exchanger corresponding to the side wall are respectively fixedly connected to the side wall by screws, and it is necessary to arrange studs on the bottom wall for the fume exhaust hood and the heat exchanger respectively, so that the parts of the fume exhaust hood and the heat exchanger located above the bottom wall are respectively fixedly connected to the stud by a screw. While a large number of screws are used in this fixing method, resulting in low production and assembly efficiency of gas water heaters.

In this solution, the fixing method of the fume exhaust hood is changed. A support protrusion and a stud are arranged on a bottom wall of a condensate water collection box, and a rib is arranged on a side of the fume exhaust hood close to the stud. When assembling the fume exhaust hood, the heat exchanger, and the condensate water collection box, first install the fume exhaust hood on the condensate water collection box. A position of the fume exhaust hood corresponding to a side wall of a condensate water collection box is fixedly connected to the side wall by screws. The rib of the fume exhaust hood is abutted against the support protrusion on the bottom wall, and a through hole on the rib is aligned with the stud. After the fume exhaust hood is in place, install the heat exchanger on the condensate water collection box. A position of the heat exchanger corresponding to the side wall is fixedly connected to the side wall by screws. A part of the heat exchanger located above the bottom wall is connected to the stud by a screw, so that the rib is pressed and fixed on the support protrusion, completing the assembly of the fume exhaust hood, the heat exchanger, and the condensate water collection box. This design reduces the number of screws, which can improve the production and assembly efficiency of gas water heaters.

In some embodiments, the top of the side wall is provided with an outwardly extending flange, and the bottom of the fume exhaust hood is connected to the flange by a screw.

In this solution, a flange is provided on the top of the side wall, and the fume exhaust hood is connected to the flange of the condensate water collection box by screws. This design can improve the reliability of the connection and fixation of the fume exhaust hood and the condensate water collection box.

Some embodiments of a second aspect of this application provides a fume exhaust assembly, applied in a gas water heater, including a fume exhaust hood, where the fume exhaust hood is provided with a fume exhaust pipe, the fume exhaust pipe and the fume exhaust hood are integrally formed, the fume exhaust hood defines a cavity, a bottom of the cavity is open, and the fume exhaust pipe is arranged at a top of the fume exhaust hood and is in communication with the cavity.

In this solution, the fume exhaust pipe and the fume exhaust hood are integrally formed. This design eliminates the assembly work of the fume exhaust pipe and the fume exhaust hood, simplifies the assembly process of the gas water heaters, and improves the production efficiency of the gas water heaters. A cavity is defined in the fume exhaust hood, the bottom of the cavity is open, and the fume exhaust pipe is arranged at the top of the fume exhaust hood and is in communication with the cavity, so that after the fume enters the fume exhaust hood, the fume enters the fume exhaust pipe from the fume exhaust hood, and then discharged from the fume exhaust pipe.

Some embodiments of a third aspect of this application provides a gas water heater, including the fume exhaust assembly provided by any one of the embodiments of the first aspect of this application.

The gas water heater provided by the embodiments of the third aspect of this application includes the fume exhaust assembly provided by any embodiment of the first aspect of this application. Therefore, the gas water heater has all the beneficial effects of the fume exhaust assembly provided by any of the foregoing embodiments, which will not be repeated here.

In some embodiments, the gas water heater further includes a fan, a burner and a heat exchanger, where an air outlet of the fan is connected to an air inlet of the burner, an air outlet of the burner is connected to an air inlet of the heat exchanger, and an air outlet of the heat exchanger is connected to an air inlet of the fume exhaust assembly.

In some embodiments, the heat exchanger of the gas water heater is an integrated condensing heat exchanger consisting of a sensible heat exchanger and a latent heat exchanger. The sensible heat exchanger directly uses the heat generated by the combustion of the gas in the burner to heat water, and the latent heat exchanger exchanges heat with the fume generated by the combustion of the gas, and heats the water through the heat of the fume.

The additional aspects and advantages of this application will become apparent in the following description, or be understood through the practice of this application.

BRIEF DESCRIPTION OF THE DRAWINGS

A description of the embodiments of this application will briefly introduce the drawings that need to be used in the description of the embodiments. The drawings in the following description are only some embodiments of this application.

The above and/or additional aspects and advantages of this application will become obvious and easy to understand from the description of the embodiments in conjunction with the following drawings, in which.

Figure 1:
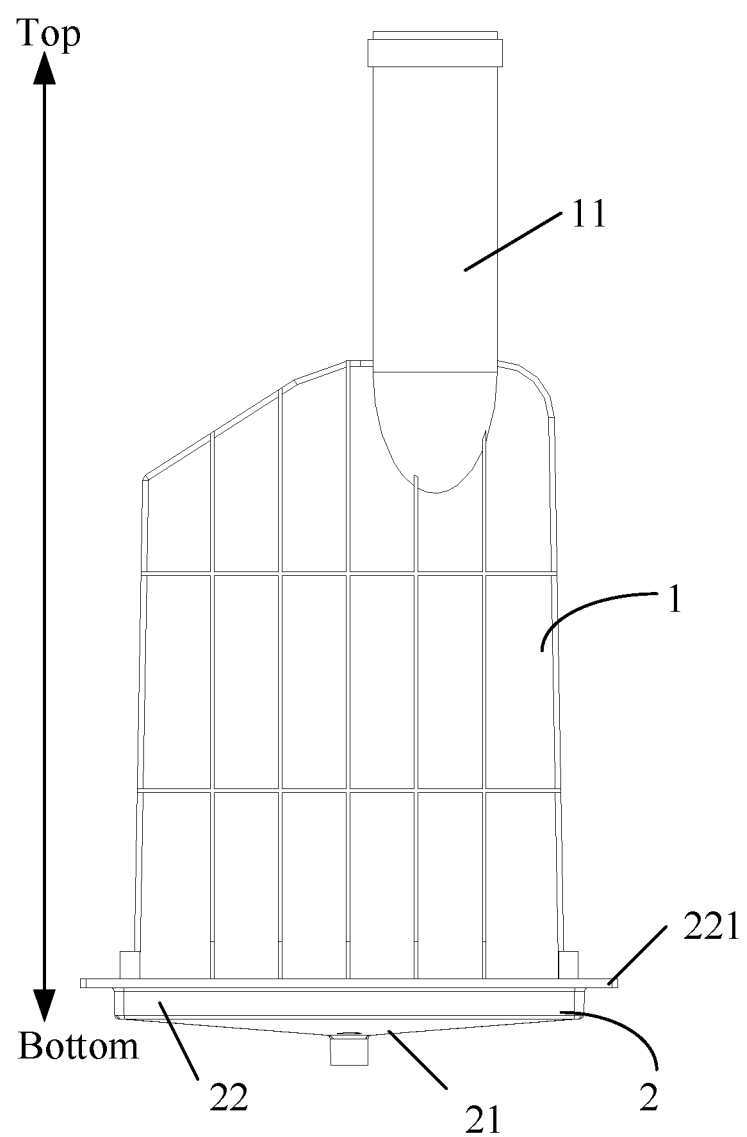
FIG. 1 is a schematic structural diagram of a fume exhaust assembly according to an embodiment of this application.
Figure 2:
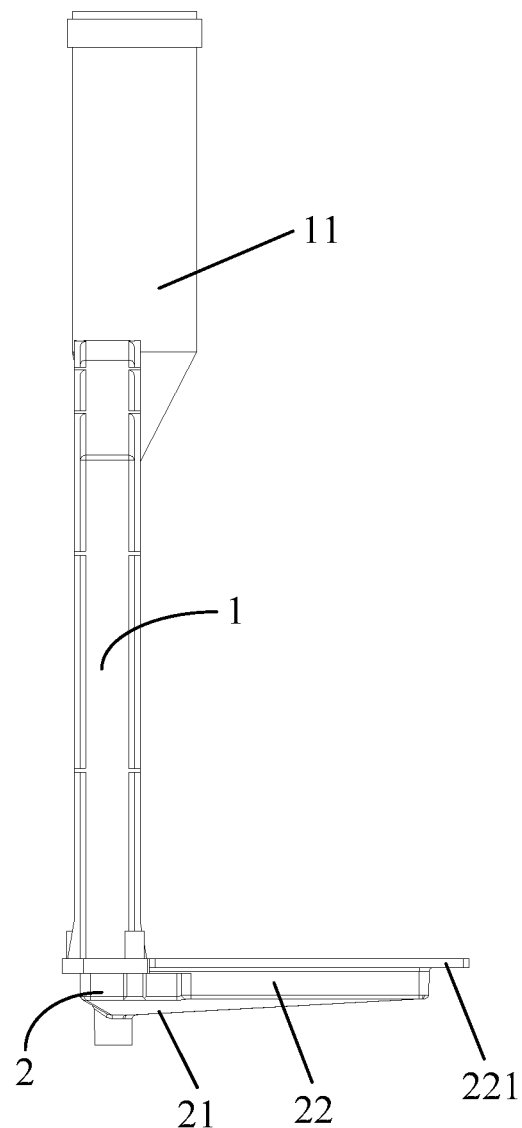
FIG. 2 is a left side view of the fume exhaust assembly shown in FIG. 1.
Figure 3:
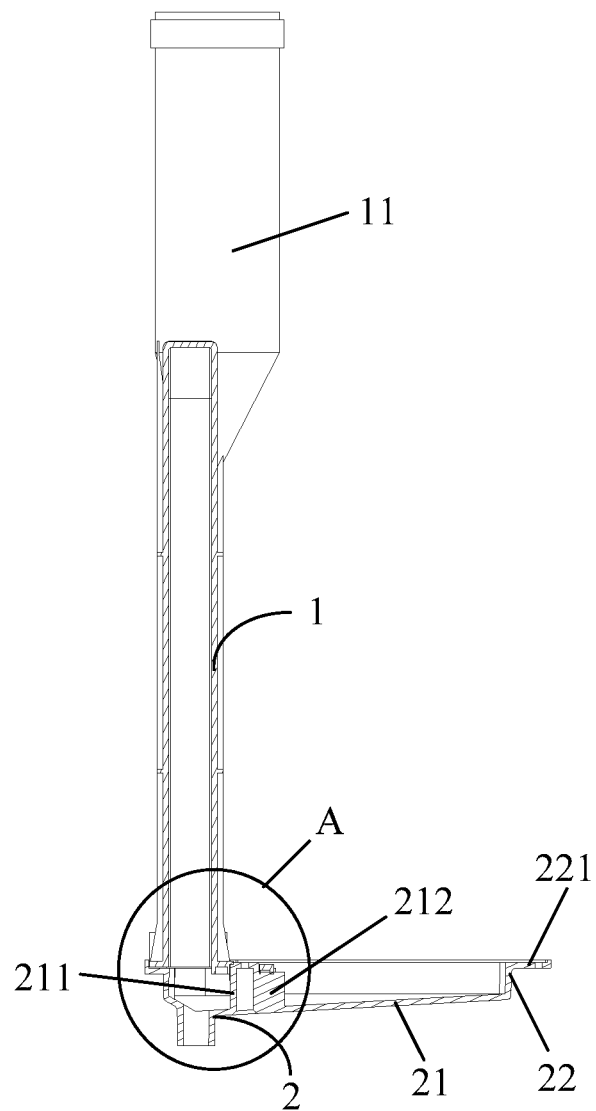
FIG. 3 is a sectional view of the fume exhaust assembly shown in FIG. 2.
Figure 4:
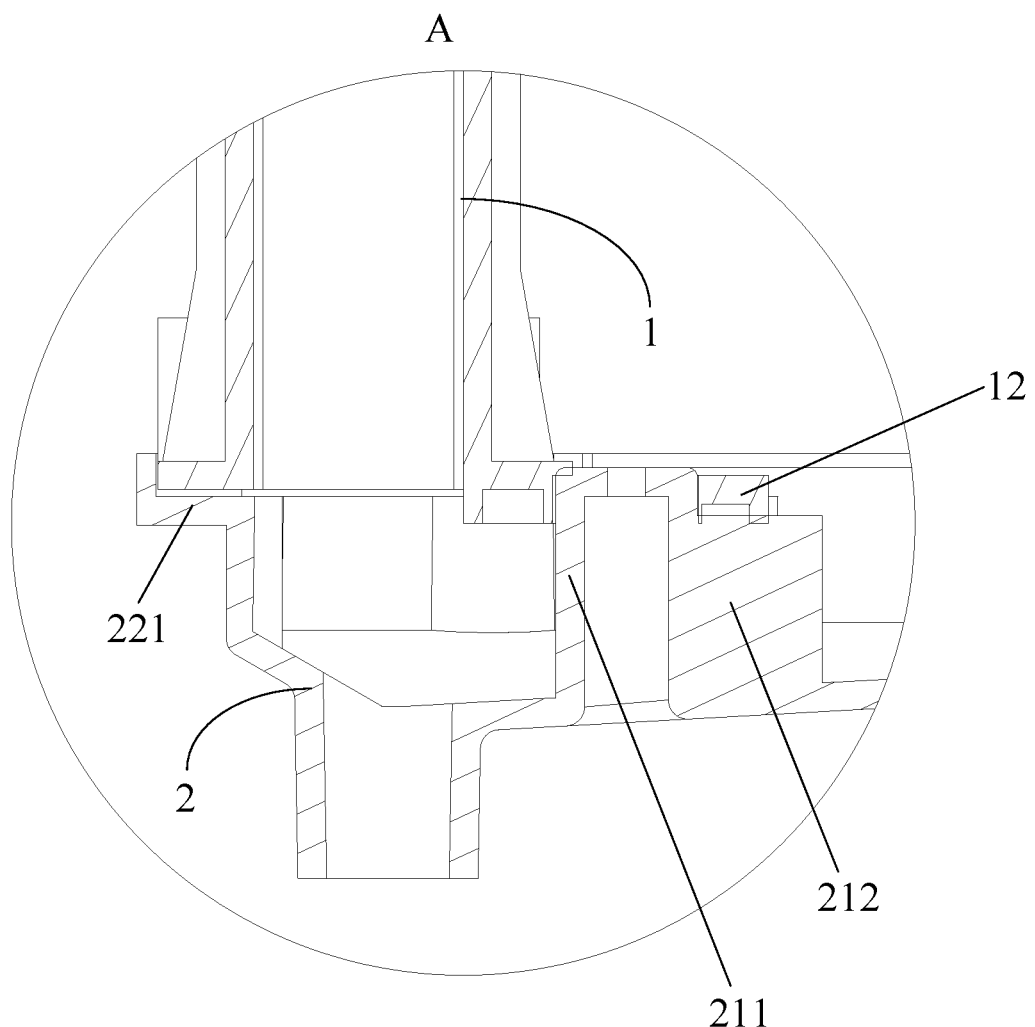
FIG. 4 is an enlarged view of part A in FIG. 3.
Figure 5:
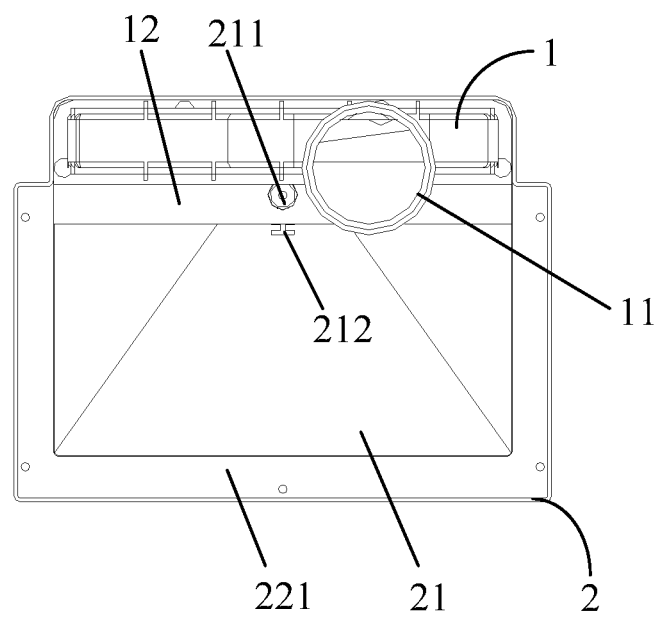
FIG. 5 is a top view of the fume exhaust assembly shown in FIG. 1.
Figure 6:
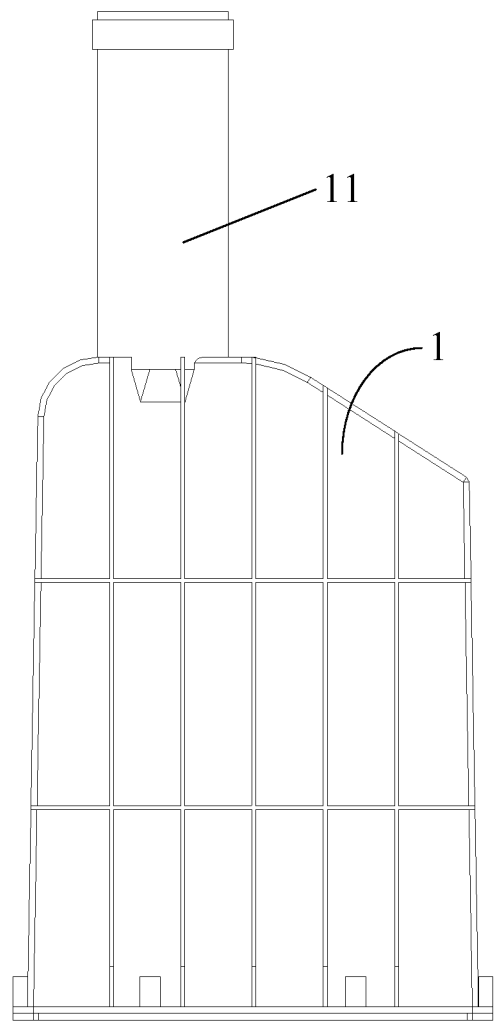
FIG. 6 is a schematic structural diagram of a fume exhaust hood shown in FIG. 1.
Figure 7:
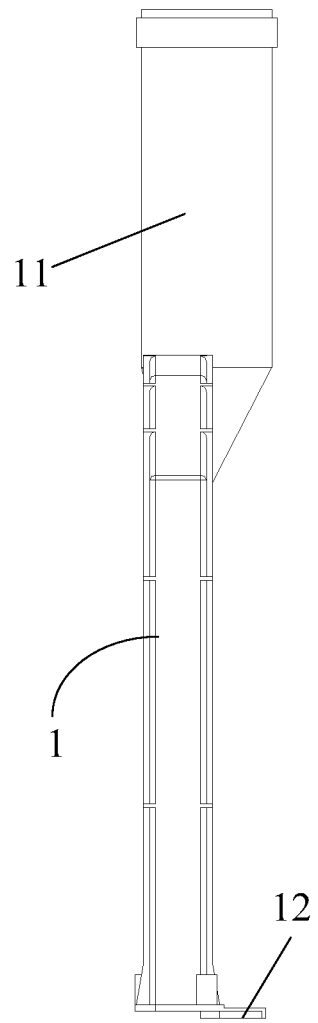
FIG. 7 is a right side view of the fume exhaust hood shown in FIG. 6.
Figure 8:
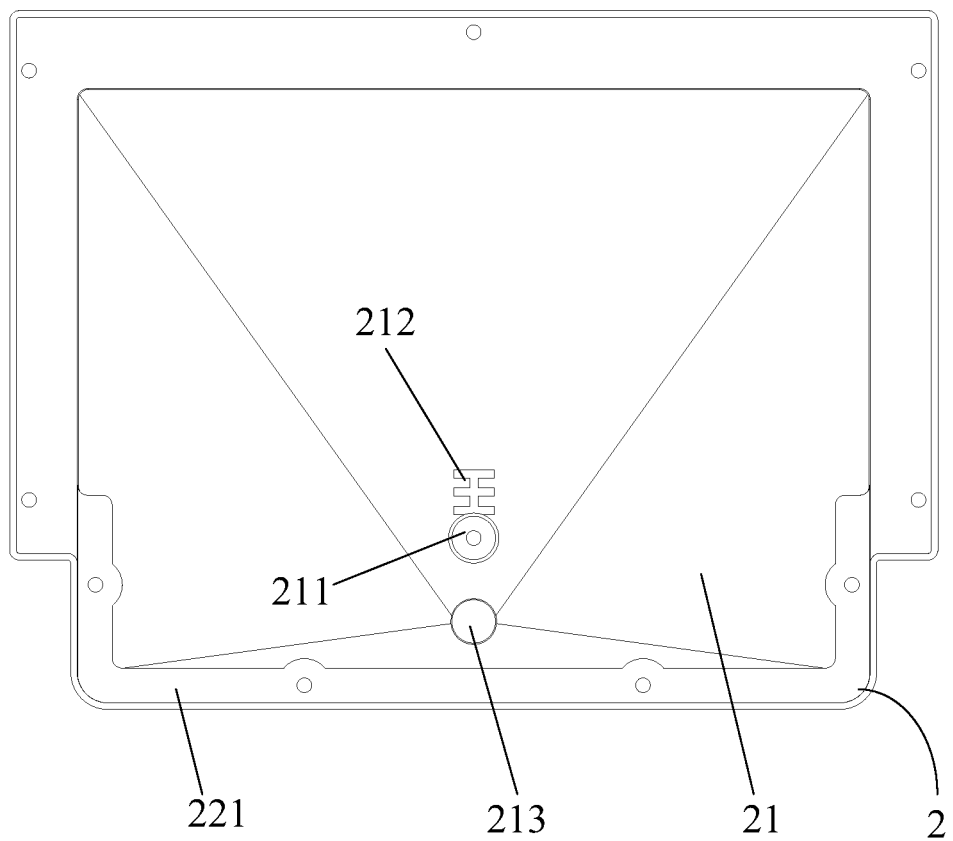
FIG. 8 is a schematic structural diagram of a condensate water collection box shown in FIG. 1.

The corresponding relationship between the reference numerals and component names in FIGS. 1 to 11 is as follows.

1 fume exhaust hood, 11 fume exhaust pipe, 12 rib, 2 condensate water collection box, 21 bottom wall, 211 stud, 212 support protrusion, 213 water outlet, 22 side wall, 221 flange, 3 fan, 4 burner, 5 heat exchanger.

The realization of the object of this application, functional characteristics, and advantages will be further described in conjunction with the embodiments and with reference to the accompanying drawings.

DETAILED DESCRIPTION OF THE DISCLOSURE

The embodiments of this application will be described clearly and completely in conjunction with the drawings in the embodiments of this application. Obviously, the described embodiments are only a part of the embodiments of this application, but not all the embodiments. Based on the embodiments in this application, all other embodiments obtained by those of ordinary skill in the art without creative work shall fall within the protection scope of this application.

It should be noted that if there is a directional indication (such as up, down, left, right, front, back . . . ) in the embodiment of this application, the directional indication is only used to explain the relative positional relationship, movement conditions, etc. among the components in a specific posture (as shown in the drawings), if the specific posture changes, the directional indicator also changes accordingly.

In addition, if there are descriptions related to "first", "second", etc. in the embodiments of this application, the descriptions of "first", "second", etc. are for descriptive purposes only, and cannot be understood as indicating or implying their relative importance or implicitly indicating the number of indicated technical features. Thus, the features defined as "first" and "second" may include at least one of the features either explicitly or implicitly. In addition, the technical solutions between the various embodiments can be combined with each other, but they must be based on the ability of those skilled in the art to realize. When the combination of technical solutions conflicts with each other or cannot be realized, it should be considered that the combination of such technical solutions does not exist, nor within the scope of protection required by this application.

Some embodiments of the first aspect of this application provides a fume exhaust assembly, applied in a gas water heater. As shown in FIGS. 1 to 11, the fume exhaust assembly includes a fume exhaust hood 1, and the fume exhaust hood 1 is provided with a fume exhaust pipe 11, and the fume exhaust pipe 11 and the fume exhaust hood 1 are integrally formed.

In this solution, the fume exhaust pipe 11 and the fume exhaust hood 1 are integrally formed. This design eliminates the assembly work of the fume exhaust pipe 11 and the fume exhaust hood 1, simplifies the assembly process of the gas water heaters, and improves the production efficiency of the gas water heaters.

In some embodiments, the fume exhaust pipe 11 and the fume exhaust hood 1 are integrally injection molded.

In this solution, both the fume exhaust pipe 11 and the fume exhaust hood 1 are made of plastic materials, and the fume exhaust pipe 11 and the fume exhaust hood 1 are integrated by injection molding, so that the production process of the fume exhaust assembly is simple and the production cost of the fume exhaust assembly is low.

In some embodiments, the fume exhaust hood 1 defines a cavity, a bottom of the cavity is open, and the fume exhaust pipe 11 is arranged at a top of the fume exhaust hood 1 and is in communication with the cavity.

In some embodiments, the fume exhaust assembly further includes a condensate water collection box 2, and the fume exhaust hood 1 is installed at a top of the condensate water collection box 2.

The fume exhaust assembly provided by this solution further includes a condensate water collection box 2. The fume exhaust hood 1 and a heat exchanger 5 of the gas water heater are installed on a top of the condensate water collection box 2. The fume formed after the combustion of the air and gas mixture enters the heat exchanger 5 first, and the temperature of the fume decreases and a certain amount of condensate is produced after the heat exchange between the fume and the heat exchanger 5. Then the fume and the condensate water enter the condensate water collection box 2 through the air outlet of the heat exchanger 5, and then the condensate water is drained from a water outlet 231 at a bottom of the condensate water collection box 2, while the fume will enter the fume exhaust hood 1 from the condensate water collection box 2, then enter the fume exhaust pipe 11 from the fume exhaust hood 1, and then discharged through the fume exhaust pipe 11.

In some embodiments, the condensate water collection box 2 includes a bottom wall 21 and a side wall 22 extending upward from an edge of the bottom wall 21, the top of the condensate water collection box 2 defines an opening, and a bottom of the fume exhaust hood 1 is connected to a top of the side wall 22.

In this solution, the condensate water collection box 2 is a box with an open top, so that the condensate water collection box 2 has a simple structure and low production and processing difficulty.

In some embodiments, the top of the side wall 22 is provided with an outwardly extending flange 221, and the bottom of the fume exhaust hood 1 is connected to the flange 221 by a screw.

In this solution, the fume exhaust hood 1 is installed on the condensate water collection box 2 by screws, so that the fume exhaust hood 1 and the condensate water collection box 2 has high reliability in connection and fixation, and the fume exhaust hood 1 and the condensate water collection box 2 are not prone to loosening. Specifically, one of the bottom of the fume exhaust hood and the flange is provided with a stud, and the other is provided with a connection hole. When the fume exhaust hood is installed on the condensate water collection box, the stud is aligned with the connection hole and fixed by screws.

As shown in FIGS. 3 to 11, In some embodiments, the bottom wall 21 is provided with a support portion including a stud 211 and a support protrusion 212, the fume exhaust hood 1 is provided with a rib 12 at a side of the bottom close to the support portion, the rib 12 defines a through hole, the rib 12 is abutted against a top of the support protrusion 212, the through hole is opposite to the stud 211, a heat exchanger 5 of the gas water heater is connected to the stud 211 by a screw, so that the rib 12 is pressed and fixed on the support protrusion 212.

In related art, the fume exhaust hood and the heat exchanger are installed on the top of the condensate water collection box, so that the fume exhaust hood, the heat exchanger and the condensate water collection box are communicated. The positions of the fume exhaust hood and the heat exchanger corresponding to the side wall are respectively fixedly connected to the side wall by screws, and it is necessary to arrange studs on the bottom wall for the fume exhaust hood and the heat exchanger respectively, so that the parts of the fume exhaust hood and the heat exchanger located above the bottom wall are respectively fixedly connected to the stud by a screw. While a large number of screws are used in this fixing method, resulting in low production and assembly efficiency of gas water heaters.

In this solution, the fixing method of the fume exhaust hood 1 is changed. A support protrusion 212 and a stud 211 are arranged on a bottom wall 21 of a condensate water collection box, and a rib 12 is arranged on a side of the fume exhaust hood 1 close to the stud 211. When assembling the fume exhaust hood 1, the heat exchanger 5, and the condensate water collection box 2, first install the fume exhaust hood 1 on the condensate water collection box 2. A position of the fume exhaust hood 1 corresponding to a side wall 22 of a condensate water collection box is fixedly connected to the side wall 22 by screws. The rib 12 of the fume exhaust hood 1 is abutted against the support protrusion 212 on the bottom wall 21, and a through hole on the rib 12 is aligned with the stud 211. After the fume exhaust hood 1 is in place, install the heat exchanger 5 on the condensate water collection box 2. A position of the heat exchanger 5 corresponding to the side wall 22 is fixedly connected to the side wall 22 by screws. A part of the heat exchanger 5 located above the bottom wall 21 is connected to the stud 211 by a screw, so that the rib 12 is pressed and fixed on the support protrusion 212, completing the assembly of the fume exhaust hood 1, the heat exchanger 5, and the condensate water collection box 2. This design reduces the number of screws, which can improve the production and assembly efficiency of gas water heaters.

Some embodiments of a second aspect of this application provides a gas water heater, including the fume exhaust assembly provided by any one of the embodiments of the first aspect of this application.

The gas water heater provided by the embodiments of the second aspect of this application includes the fume exhaust assembly provided by any embodiment of the first aspect of this application. Therefore, the gas water heater has all the beneficial effects of the fume exhaust assembly provided by any of the foregoing embodiments, which will not be repeated here.

Figure 9:
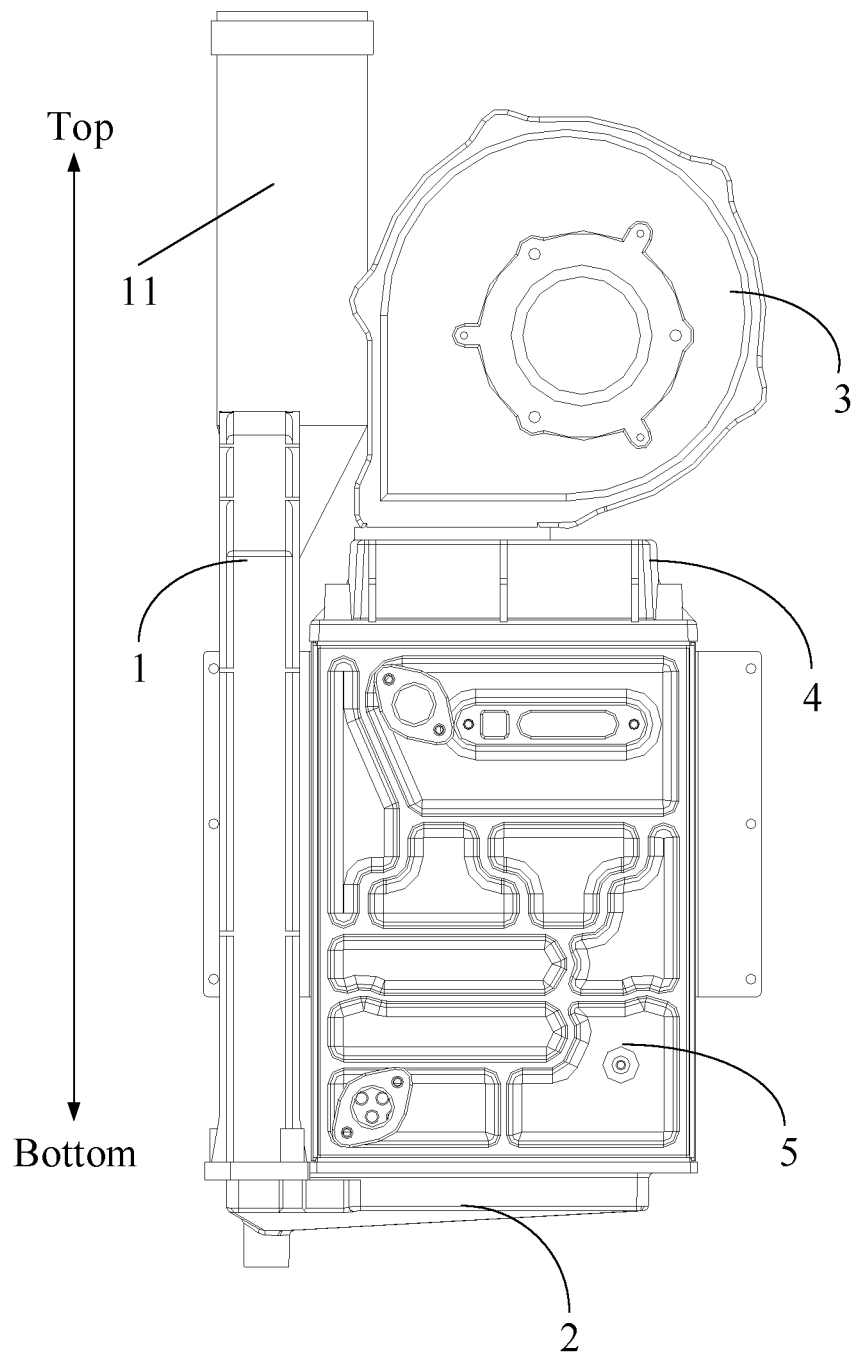
FIG. 9 is a schematic structural diagram of a gas water heater according to an embodiment of this application.
Figure 10:
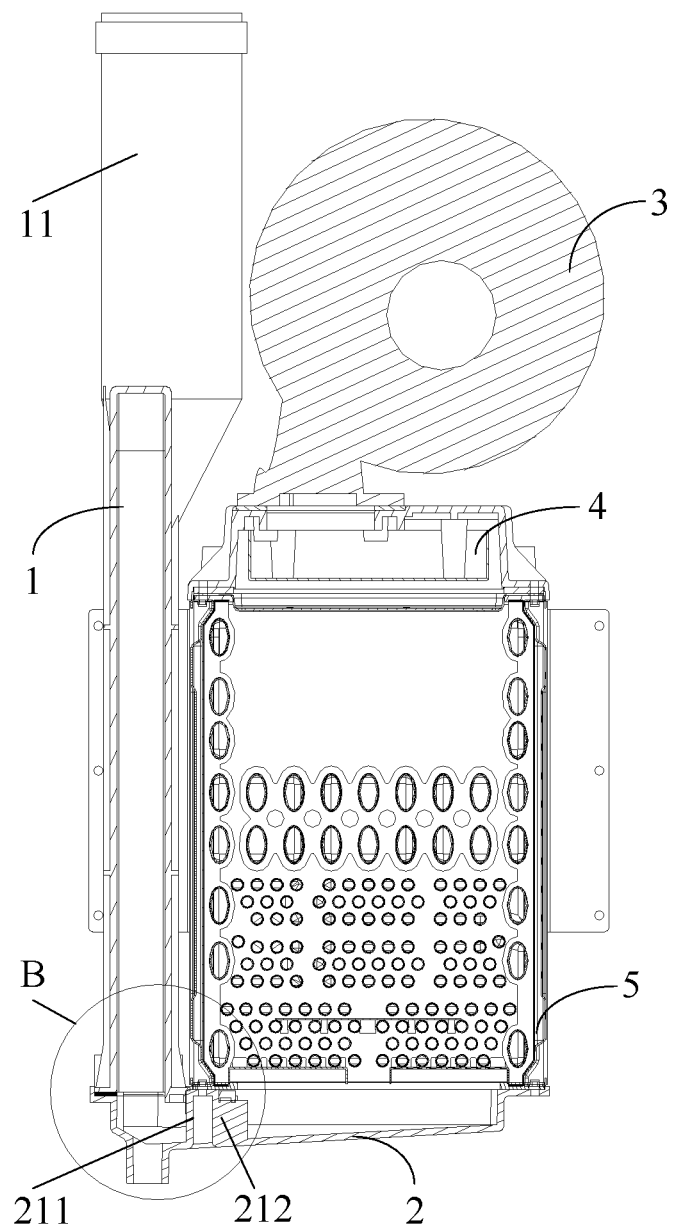
FIG. 10 is a sectional view of the gas water heater shown in FIG. 9.
Figure 11:
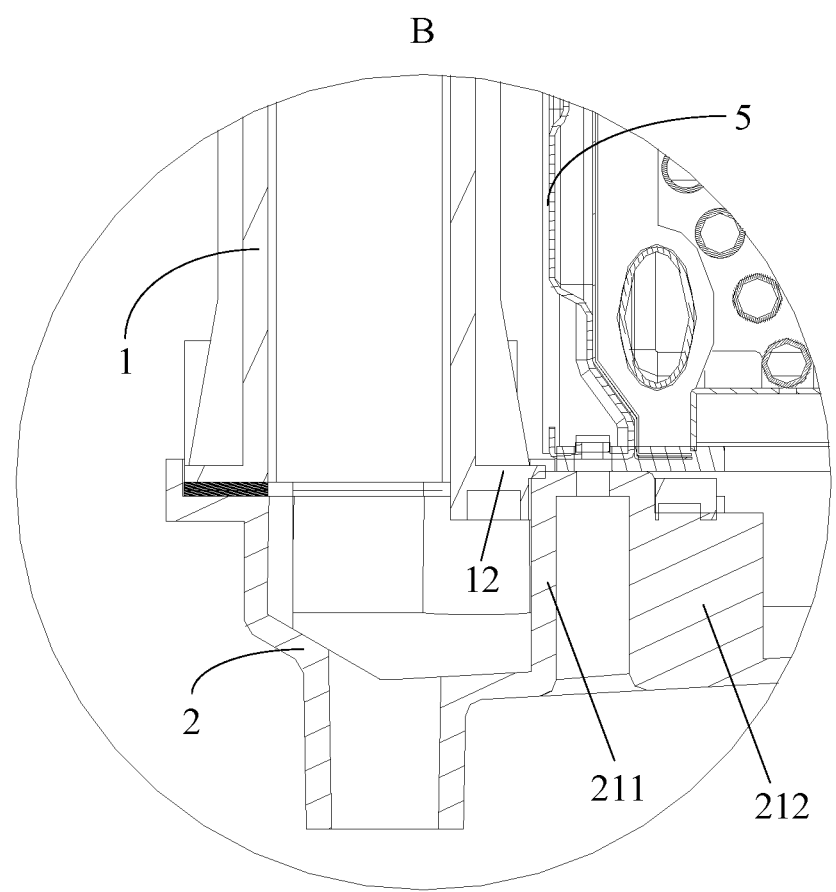
FIG. 11 is an enlarged view of part B in FIG. 10.

An embodiment of this application provides a fully premixed condensing gas water heater, as shown in FIGS. 9 to 11, the fully premixed condensing gas water heater includes a fan 3, a burner 4, a heat exchanger 5 and the fume exhaust assembly provided by any embodiment of the first aspect. An air outlet of the fan 3 is connected to an air inlet of the burner 4, an air outlet of the burner 4 is connected to an air inlet of the heat exchanger 5, and an air outlet of the heat exchanger 5 is connected to an air inlet of the fume exhaust assembly.

In some embodiment, the heat exchanger of the gas water heater is an integrated condensing heat exchanger consisting of a sensible heat exchanger and a latent heat exchanger. The sensible heat exchanger directly uses the heat generated by the combustion of the gas in the burner to heat water, and the latent heat exchanger exchanges heat with the fume generated by the combustion of the gas, and heats the water through the heat of the fume.

In the description of this application, it should be noted that the terms "top", "bottom", etc. indicate the orientation or positional relationship based on the orientation or positional relationship shown in the drawings, only for the convenience of describing the present application and simplify the description, rather than indicating or implying that the device or element referred to must have a specific orientation, be constructed and operate in a specific orientation, and therefore cannot be construed as limiting the present application. The terms "connected", "installed", "fixed", etc. should be understood in a broad sense. For example, "connected" can be a fixed connection, a detachable connection, or an integral connection; it can be directly connected or indirectly connected through an intermediary. For those of ordinary skill in the art, the specific meanings of the above-mentioned terms in this application can be understood according to specific circumstances.

In the description of this specification, the description referring to the terms "one embodiment", "some embodiments", "schematic embodiment", "example", "specific examples", or "some examples" means specific features, structures, materials or characteristics described in conjunction with the embodiment or examples are included in at least one embodiment or example of this application. In this specification, the schematic expression of the above terms does not necessarily refer to the same embodiment or example. Moreover, the specific features, structures, materials, or characteristics described may be combined in any suitable manner in any one or more embodiments or examples.

What is claimed is:

1. A fume exhaust assembly of a gas water heater, comprising:
    a fume exhaust hood and a condensate water collection box, wherein a fume exhaust pipe is provided on top of the fume exhaust hood, and the fume exhaust pipe and the fume exhaust hood are integrally formed;
    wherein the fume exhaust hood is on top of the condensate water collection box and defines a cavity, a bottom of the cavity is open, and the fume exhaust pipe is in communication with the cavity;
    wherein the condensate water collection box comprises a bottom wall and a side wall extending upward from an edge of the bottom wall, the top of the condensate water collection box defines an opening, and a bottom of the fume exhaust hood is connected to a top of the side wall of the condensate water collection box.

2. The fume exhaust assembly of claim 1, wherein the fume exhaust pipe and the fume exhaust hood are integrally injection molded.

3. The fume exhaust assembly of claim 1, wherein the bottom of the fume exhaust hood is connected to the top of the side wall by screws.

4. The fume exhaust assembly of claim 1, wherein the bottom wall is provided with a support portion comprising a stud and a support protrusion, the fume exhaust hood is provided with a rib at a side of the bottom close to the support portion, the rib defines a through hole, the rib is abutted against a top of the support protrusion, the through hole is opposite to the stud, a heat exchanger of the gas water heater is connected to the stud by a screw, so that the rib is pressed and fixed on the support protrusion.

5. The fume exhaust assembly of claim 1, wherein the top of the side wall is provided with an outwardly extending flange, and the bottom of the fume exhaust hood is connected to a flange by a screw.

6. A gas water heater, comprising a fume exhaust assembly,
    wherein the fume exhaust assembly comprises a fume exhaust hood and a condensate water collection box, a fume exhaust pipe is provided on top of the fume exhaust hood, and the fume exhaust pipe and the fume exhaust hood are integrally formed;
    wherein the fume exhaust hood is on top of the condensate water collection box and defines a cavity, a bottom of the cavity is open, and the fume exhaust pipe is in communication with the cavity;
    wherein the condensate water collection box comprises a bottom wall and a side wall extending upward from an edge of the bottom wall, the top of the condensate water collection box defines an opening, and a bottom of the fume exhaust hood is connected to a top of the side wall of the condensate water collection box.

7. The gas water heater of claim 6, further comprising a fan, a burner and a heat exchanger, wherein an air outlet of the fan is connected to an air inlet of the burner, an air outlet of the burner is connected to an air inlet of the heat exchanger, and an air outlet of the heat exchanger is connected to an air inlet of the fume exhaust assembly.

8. The gas water heater of claim 6, wherein the fume exhaust pipe and the fume exhaust hood are integrally injection molded.

9. The fume exhaust assembly of claim 6, wherein the bottom of the fume exhaust hood is connected to the top of the side wall by screws.

10. The gas water heater of claim 6, wherein the bottom wall is provided with a support portion comprising a stud and a support protrusion, the fume exhaust hood is provided with a rib at a side of the bottom close to the support portion, the rib defines a through hole, the rib is abutted against a top of the support protrusion, the through hole is opposite to the stud, a heat exchanger of the gas water heater is connected to the stud by a screw, so that the rib is pressed and fixed on the support protrusion.

11. The gas water heater of claim 6, wherein the top of the side wall is provided with an outwardly extending flange, and the bottom of the fume exhaust hood is connected to a flange by a screw.

\* \* \* \* \*